Patented July 10, 1945

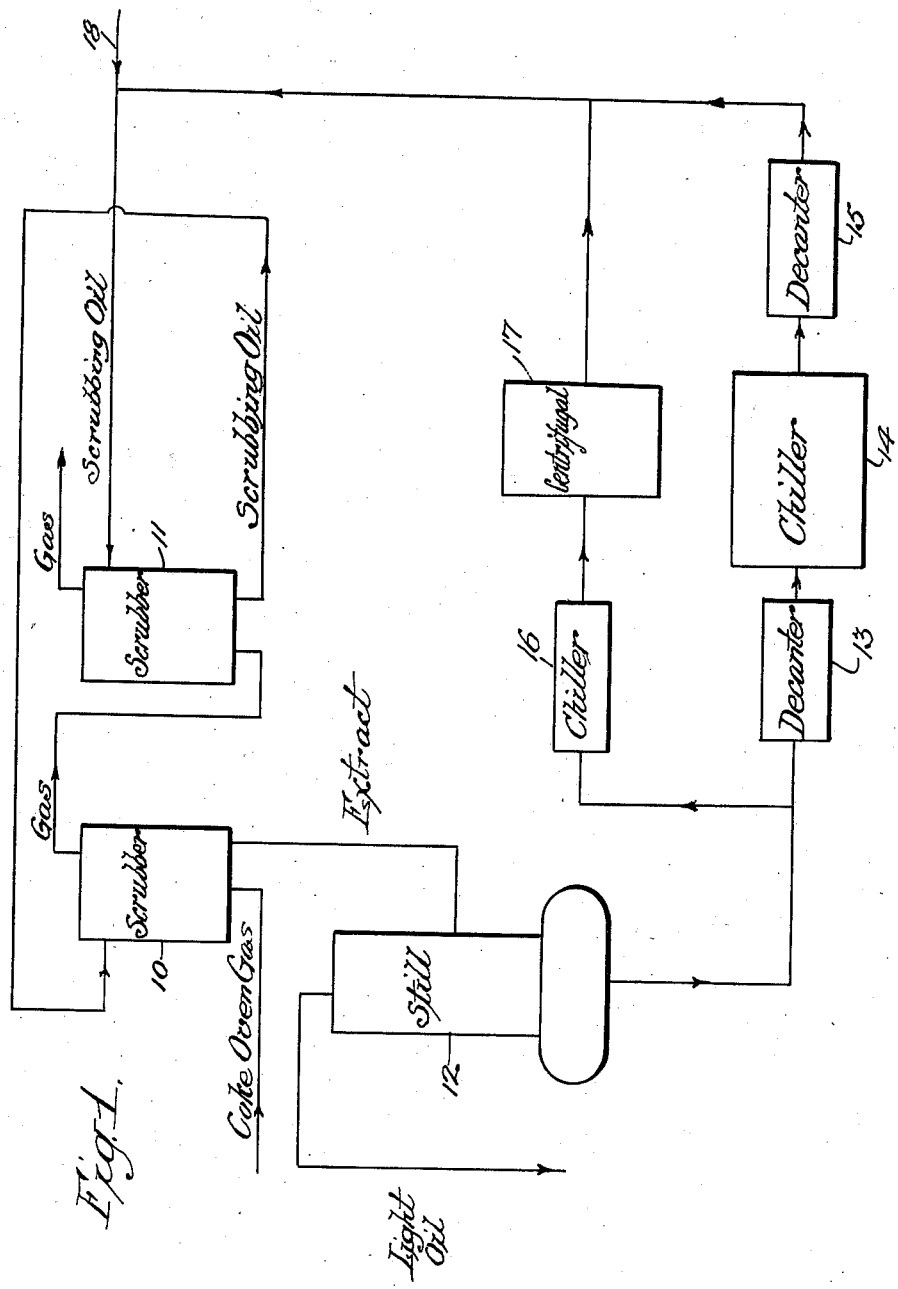

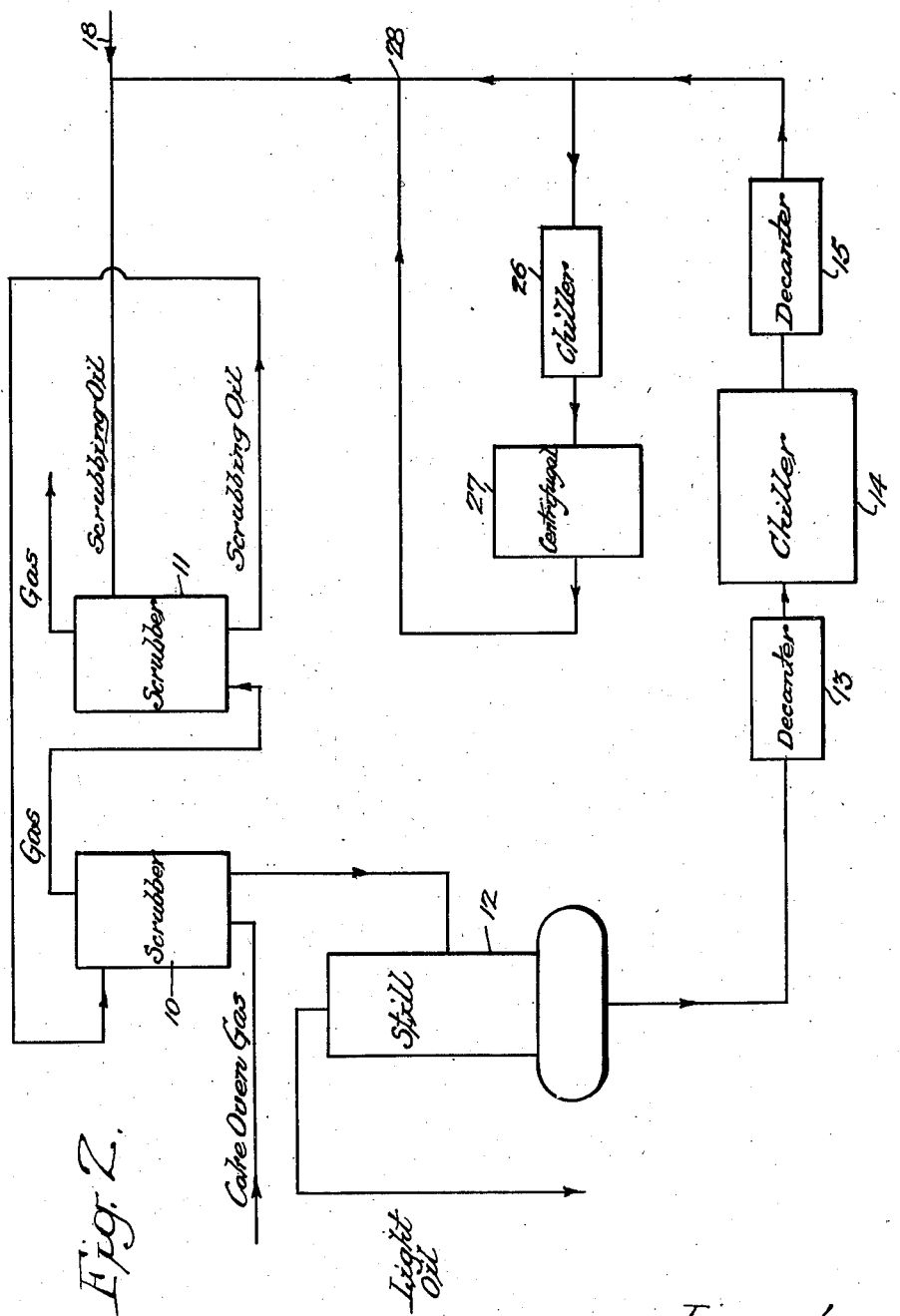

2,380,139

UNITED STATES PATENT OFFICE 2,380,139

PURIFICATION OF EXTRACTING SOLVENTS

Charles M. Ambler, Jenkintown, Pa., assignor to The Sharples Corporation, Philadelphia, Pa., a corporation of Delaware Application July 21, 1942, Serial No. 451,735

5 Claims. (Cl. 196—8)

The present invention involves the purification and re-use of an extraction solvent in a cyclic extraction process. It pertains especially to the performance of the purifying step by cooling the solvent to precipitate impurities between extraction steps and separating the precipitated impurities before returning the solvent to the extraction step.

In a purification process of this kind, it sometimes happens that impurities precipitated by the chilling operation tend to deposit within the chilling apparatus and thus impair the efficiency of heat exchange in performance of this step. The only remedy for such a situation is to provide expensive scraping machinery for keeping the interior surfaces of the chiller through which the solvent passes clean. In cases in which large quantities of solvent are employed, the provision of chilling equipment of this kind represents a very considerable expense, and a feature of the present invention consists in the fact that it provides a process by which this expense may be minimized. The invention was conceived and first applied as a solution of problems encountered in extraction of light oil from gases in which it is contained, such as coke oven gas, and the fundamental nature of the problem as well as that of the present invention may be best understood by reference to the particular problems encountered in this connection, as more fully set forth in the following detailed description by reference to the attached drawings.

In the drawings,

Figure 1 represents a preferred embodiment of the invention, and

Figure 2 represents a satisfactory alternative embodiment.

Referring to the drawings by reference characters, a system for scrubbing the light oil from coke oven gas is illustrated, in which the numerals 10 and 11 illustrate scrubber columns with connections for scrubbing light oil from coke oven gas by passing the coke oven gas in counter-current relationship with respect to a scrubbing oil through the columns. The extract, consisting of the solution of light oil and impurities extracted from the coke oven gas in the columns 10 and 11, is passed to the still 12, from which the light oil is removed as a distillate. The residue of the distillation step in the still 12 consists of the scrubbing oil, containing as impurities ingredients in suspension and in solution which have been extracted from the gas in the scrubber columns 10 and 11. This residue may be passed through a decanter 13 while still hot to effect removal of undissolved impurities, and it may then be passed through a chiller 14, in which it is chilled to a temperature sufficiently low to throw a large proportion of the previously dissolved impurities out of solution in order that they may be removed in the decanter 15. The scrubbing oil, largely freed of impurities in this manner, is then returned to the scrubber column 11 for re-use.

The system as described above is more or less conventional, and its use will be well understood by those skilled in the art. The present invention is directed to the solution of particular problems encountered in the use of such a system. In the early stages of use of such a system, after fresh scrubber oil has been introduced through the connection 18, no particular difficulty is encountered unless the chiller 14 is operated to chill the oil to an unusually cold temperature, for impurities precipitated by the cooling operation of the chiller 14 during the early stages of the operation are of such a character that they flow with the oil to the decanter 15, and may be removed from the system by the operation of this decanter. After the oil has been re-used a number of times, however, it becomes more and more contaminated with impurities which are of a fundamentally gummy nature, and when these impurities exceed a certain degree of concentration, they begin to precipitate within the chiller 14, with the result that they coat the inner surfaces of this chiller, due to their adhesive nature.

This coating of the chiller surfaces impairs the heat exchange efficiency of the chiller, with the result that the chilling efficiency becomes seriously impaired, and that the chiller may ultimately become entirely clogged with these gummy impurities.

A solution to the problem caused by precipitation of these impurities upon the chiller surfaces might be obtained by providing mechanical scrapers within the chiller surfaces, but such solution would involve an enormous expense for chiller equipment, in view of the large volume of oil requiring chilling.

In the practice of the present invention, the requirement of providing expensive chilling equipment provided with scrapers for the entire body of oil under treatment is eliminated by providing a continuous by-pass system through which a portion of the body of oil is passed between successive uses of that oil in the scrubbing operation. By passing only a small portion of the oil through a special chiller 16, and chilling the oil in that chiller to a temperature considerably lower than that to which the remainder, or main body of the oil, is subjected, and then removing impurities precipitated from the oil in the chiller 16 before re-combining this separately chilled portion with the main body of the oil for re-use, the quantity of gums in the oil may be retained sufficiently low to avoid precipitation of gums from the main body of the oil, during the passage of that oil from the still 12 through the steps to which it is subjected prior to re-use in the scrubber 11. In the preferred embodiment of the invention, impurities precipitated in the chiller 16 are removed by sedimentation from the oil. This may be accomplished by gravity settling, but it is preferably accomplished in a centrifugal 17 of the clarifier type, since the centrifugal operation results in a rapid and efficient removal of a sufficient proportion of the gummy impurities to maintain the concentration of these impurities in the recirculating oil passing through the decanter 13, chiller 14 and decanter 15 sufficiently low to avoid precipitation of the adhesive or gummy impurities in this portion of the system.

By by-passing and more drastically chilling a portion of the oil as discussed above, and removing the precipitated impurities from this oil in the centrifugal 17, the interior surfaces of the chiller 16 in which this more drastic chilling is accomplished are the only surfaces which need to be provided with special scraping equipment to prevent adhesion of the gums thereto. Since the portion of the oil passing through the chiller 16 and centrifugal 17 is much smaller than the portion passing through the elements 13, 14 and 15 of the apparatus, it will be evident that the equipment for practice of the process of the present invention is much less expensive than that which would be required to drastically chill the main body of the oil passing through the chiller 14, while avoiding adhesion of impurities to that chiller.

In the embodiment of the invention illustrated in Figure 2 of the drawings, the elements 10 to 15 represent the same parts as in Figure 1, and this embodiment of the invention is substantially identical with that of Figure 1, insofar as performance of the steps described in connection with these elements is concerned. In Figure 2, however, the entire body of oil passing from the still 12 is passed through decanter 13, chiller 14 and decanter 15, the small portion of the oil by-passed from the main flow leaving the main body of the oil only after it has passed through the decanter 15. The by-passed portion is passed through chiller 26, where it is chilled to a temperature substantially colder than that attained in the chiller 14, and the gummy impurities precipitated in the chiller 26 are removed by the centrifugal 27, which corresponds to the centrifugal 17 in Figure 1 of the drawings. After removal of the gummy or adhesive impurities by the centrifugal 27, the by-passed portion of the oil is returned to the main flow at 28, and passes thence to the scrubber 11, where it is re-used in the scrubbing operation.

It will be seen that, by the simple expedient of dividing the body of solvent employed in the extracting operation, cooling a divided portion of the body of solvent to a temperature below that of the remainder, removing impurities precipitated by this cooling operation, and thereafter combining the divided portion with the remainder of the solvent for re-use in the process, the process of scrubbing may be continued indefinitely without accumulation of adhesive impurities to such a degree that they precipitate in the milder chilling operation performed in the chiller 14. The oil may thus be retained in a condition in which the objectionable fouling of the interior surfaces of the chiller 14 is avoided, without resort to the expensive procedure of providing scraping equipment for this large chiller.

*Example*

In a commercial plant for extraction of light oil from coke oven gases, involving a system for recovering light oil from the extract and recirculating the extract to the scrubbing operation, there were 35,000 gallons of scrubbing oil circulating in the system at a rate of 22,000 gallons per hour. A by-pass line was arranged in that system substantially as illustrated in Figure 1 of the drawings, the chiller 16 being a chiller provided with a mechanical scraper, and the centrifugal 17 being a centrifugal provided with special sludge discharge outlets, substantially as described and illustrated in the patent to Harold C. Fitzsimmons, No. 2,286,354. Approximately 1/20 of the circulating stream of scrubbing oil was by-passed through the elements 16 and 17 of the system and cooled to a temperature of 21° C. in the chiller 16 before centrifugation in the centrifugal 17, while the remainder of the oil was chilled to a temperature between 37° C. and 31° C. in the chiller 14, being subjected to decantation in the decanters 13 and 15. After this type of operation had been in practice for a number of hours, it was noted that the temperature of the oil passing through the chiller 14 gradually decreased, indicating a decrease in the quantity of impurities precipitated on the surface of that chiller, with resulting improvement in thermal efficiency. During the continuation of the recirculation and re-use of this oil over a 90 hour period, the temperature of the oil fed to the centrifugal 17 dropped from 21° C. to 15° C., while that fed to the decanter 15 dropped from 37° C. to 31° C., indicating a substantial improvement in the quantity of impurities contained in the oil under treatment. By virtue of the reduced temperature of the oil as recirculated to the scrubber 11, considerable improvement of the scrubbing efficiency occurred as the result of incorporation of this system.

Various modifications are possible within the scope of the invention, and I do not therefore wish to be limited except by the scope of the following claims.

I claim:

1. In the treatment of an extracting solvent used in a process comprising the extraction of the material to be treated by said solvent and subsequent re-use of the solvent in the extracting operation, the novel steps comprising effecting purification of the solvent between extraction steps by dividing the body of the solvent between said steps, cooling a divided portion of the body of solvent to a temperature below that of the remainder, removing impurities precipitated by the cooling from said divided portion, cooling the remainder of the body of solvent to a temperature higher than that to which said last-mentioned divided portion is cooled, removing impurities from said less drastically cooled remainder of the body of solvent which are precipitated by the cooling thereof, and thereafter combining said more drastically cooled portion with the less drastically cooled remainder of the solvent for re-use in the extracting operation.

2. In the treatment of an extracting solvent used in a process comprising the extraction of the material to be treated by said solvent and subsequent re-use of the solvent in the extracting operation, the novel steps comprising effecting purification of the solvent between extraction steps by dividing the body of the solvent between said steps, cooling a divided portion of the body of solvent to a temperature below that of the remainder, removing impurities precipitated by the cooling from said divided portion, separately cooling the remainder of the body of the solvent to a temperature higher than that to which said last-mentioned divided portion is cooled, removing impurities from said less drastically cooled remainder of the body of solvent which are precipitated by the cooling thereof, and thereafter combining said more drastically cooled portion with the less drastically cooled remainder of the solvent for re-use in the extracting operation.

3. In the treatment of an extracting solvent used in a process comprising the extraction of the material to be treated by said solvent and subsequent re-use of the solvent in the extracting operation, a process comprising effecting purification of the solvent between extraction steps by steps including cooling at least the major portion of said solvent between extraction steps to convert said solvent and impurities contained therein to a condition in which removal of said impurities is facilitated, and separating impurities from said cooled solvent, separating from the main body of solvent between extracting steps a divided portion, cooling said divided portion to a temperature below that to which the remainder is cooled, in order to precipitate from said divided portion impurities of a type not precipitated by the cooling step to which the remainder is subjected, removing from said divided portion impurities precipitated by the more drastic cooling step to which said divided portion is subjected, and thereafter re-combining said divided portion with the main body of said solvent for re-use in the extracting operation.

4. In the recovery of light oil from gas containing the same by extraction of the gas with a solvent, separation from the solvent of the light oil extracted thereby, and subsequent re-use of the solvent in the extraction operation, the novel steps comprising effecting purification of the solvent after removal of the light oil between extraction steps by dividing the body of solvent between said steps, cooling a divided portion of the body of solvent to a temperature below that of the remainder, removing impurities precipitated by the cooling of said divided portion, cooling the remainder of the body of solvent to a temperature higher than that to which said last-mentioned divided portion is cooled, removing impurities from said less drastically cooled remainder, and thereafter combining said more drastically cooled portion with the less drastically cooled remainder of the solvent for re-use in the extracting operation.

5. In the treatment of an extracting solvent used in a process comprising the extraction of the material to be treated by said solvent and subsequent re-use of the solvent in the extracting operation, the novel steps comprising cooling the solvent between extraction steps, thereafter dividing the cooled body of solvent, cooling a divided portion of the body of solvent to a temperature below that of the remainder, removing impurities precipitated by the separate cooling of said last-mentioned divided portion and thereafter combining said portion with the remainder of solvent for re-use in the extracting operation and also removing impurities from the less drastically cooled body of the solvent from which the divided portion is separated to be more drastically cooled.

CHARLES M. AMBLER.